(No Model.)

B. WHITEHEAD.
COMBINED COTTON CHOPPER AND CULTIVATOR.

No. 416,880. Patented Dec. 10, 1889.

Witnesses.
A. Ruppert,
H. A. Daniels

Inventor:
Berne Whitehead
Per
Thomas P. Simpson
Atty

UNITED STATES PATENT OFFICE.

BERNE WHITEHEAD, OF IMBODEN, ARKANSAS.

COMBINED COTTON CHOPPER AND CULTIVATOR.

SPECIFICATION forming part of Letters Patent No. 416,880, dated December 10, 1889.

Application filed August 19, 1889. Serial No. 321,316. (No model.)

*To all whom it may concern:*

Be it known that I, BERNE WHITEHEAD, a citizen of the United States, residing at Imboden, in the county of Lawrence and State of Arkansas, have invented a certain new and useful Combined Cotton Chopper and Scraper; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of my invention is to thin out a row of cotton plants and scrape each side of the row at a single operation.

Figure 1:
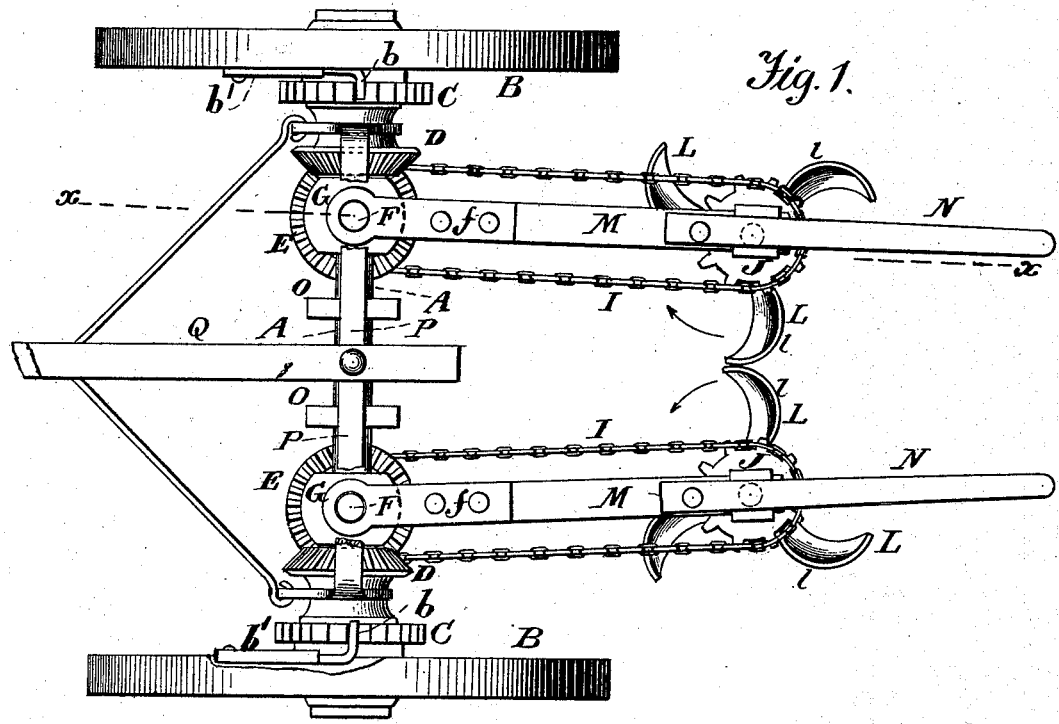
Figure 2:
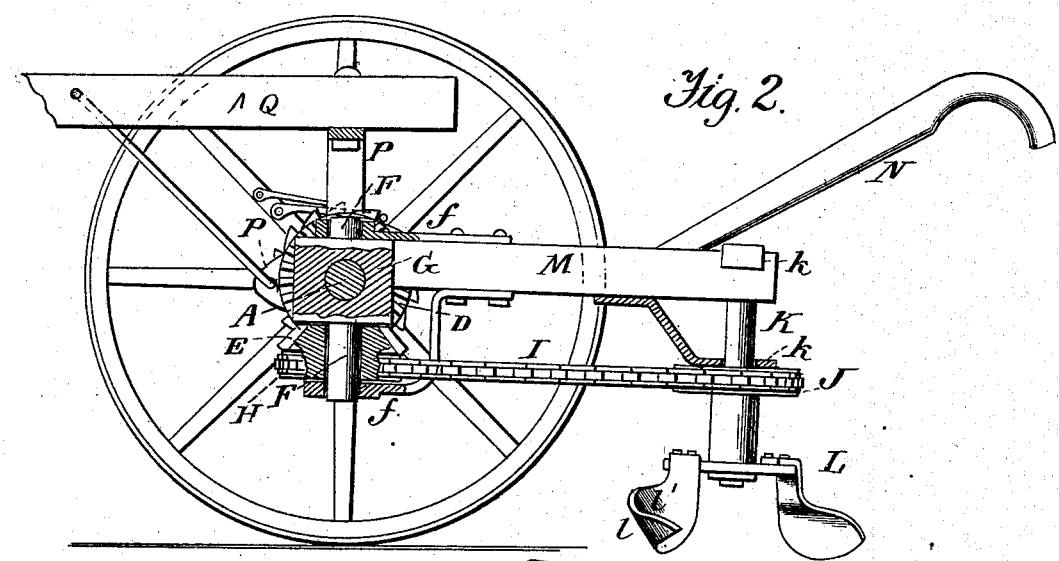
Figure 3:
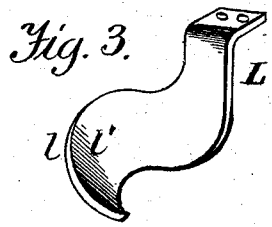

Figure 1 of the drawings is a top plan view, and Fig. 2 a vertical longitudinal section on dotted line $x\ x$. Fig. 3 is a detail perspective of the blade.

In the drawings, A represents the axle, on which rotate the wheels B B when the vehicle is backed, but which wheels carry it around when the vehicle is moved forward by means of the pawls $b$, the latter being held by the springs $b'$ in the teeth of a ratchet-wheel C, which is fast to the axle.

D is a bevel spur-wheel fast to the axle and meshing with another one E, which is loose on a fixed vertical trunnion F of the sliding block G. The latter's trunnions F F are fixed in the bearings $f f$, which turn on them. The sprocket-wheel H is loose on trunnion F and connected by a sprocket-chain I with the sprocket-wheel J, which is fast on the shaft K. The latter revolves in bearings $k\ k$ and carries at its lower end the blades L, which have the front face $l'$ concaved or spoon-shaped and the under edge sickle-shaped to scrape the surface of the ground and thus cut up all undesirable plant growth. With this construction the beams M M may be turned by the driver up or laterally. This is done with the handles N N, by which the blocks G G may also be slid on the axle, so as to throw the blades L out of gear with the driving mechanism, while the pivoting of these blocks on the axle permits the vertical movement of the beams M.

O O are fixed collars on the axle A, and P a yoke to which the pole Q is made fast, the yoke being pivoted so as to turn on the axle as the pole is raised or lowered.

Before starting to work, one blade on each shaft K is brought opposite to the other and the sprocket-chain adjusted, when the machine is ready for use. The ground-wheels B B carry the axle around, which, by means of intermediate mechanism, rotates the blades L. The latter come together in pairs, one of a pair on each shaft, so as to meet in the middle of the row at intervals, thus chopping out the stalks intended to be removed and leaving those which are meant to grow. In this way the plants are thinned by chopping out at intervals, while each side of the row is nicely scraped, the weeds being thus eradicated and the crust of the soil broken up.

Having thus described all that is necessary to a full understanding of my invention, what I claim as new, and desire to protect by Letters Patent, is—

1. A cotton-chopper and scraper-blade having its front face concaved and its lower edge sickle-shaped, as and for the purpose set forth.

2. The combination, with the chopper standards or shafts and beams, the fast sprocket-wheels J, endless chains I, and axle spur-wheels D, of the sliding blocks G, having the fixed vertical trunnions F, carrying the loose wheels H E, whereby the choppers may be moved vertically, horizontally to the right or left, or rotated, as set forth.

In testimony whereof I affix my signature in presence of two witnesses.

BERNE WHITEHEAD.

Witnesses:
F. B. RIPPEE,
THOS. H. KELL.